United States Patent
Yang et al.

(10) Patent No.: US 12,188,905 B2
(45) Date of Patent: Jan. 7, 2025

(54) LAMB WAVE PHASED ARRAY FOCUS-IMAGING METHOD BASED ON FREQUENCY RESPONSE FUNCTION

(71) Applicant: XI'AN JIAOTONG UNIVERSITY, Shaanxi (CN)

(72) Inventors: Zhibo Yang, Shaanxi (CN); Mingfeng Zhu, Shaanxi (CN); Xuefeng Chen, Shaanxi (CN); Shaohua Tian, Shaanxi (CN); Ming Li, Shaanxi (CN); Xingwu Zhang, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 666 days.

(21) Appl. No.: 17/514,868

(22) Filed: Oct. 29, 2021

(65) Prior Publication Data

US 2022/0205952 A1   Jun. 30, 2022

(30) Foreign Application Priority Data

Dec. 24, 2020   (CN) .......................... 202011555881.5

(51) Int. Cl.
*G01N 29/06* (2006.01)
*G01N 29/04* (2006.01)
(Continued)

(52) U.S. Cl.
CPC ......... *G01N 29/069* (2013.01); *G01N 29/041* (2013.01); *G01N 29/2437* (2013.01);
(Continued)

(58) Field of Classification Search
CPC ............... G01N 29/069; G01N 29/041; G01N 29/2437; G01N 29/46; G01N 2291/023;
(Continued)

(56) References Cited

U.S. PATENT DOCUMENTS

2009/0048789 A1* 2/2009 Yu .................. G01N 29/262
  73/625
2009/0301198 A1* 12/2009 Sohn ............... G01N 29/262
  73/598

FOREIGN PATENT DOCUMENTS

CN   103792287 A  *  5/2014
CN   114062492 A  *  2/2022

OTHER PUBLICATIONS

Xu, Cai-bun et al., A weighted sparse reconstruction-based ultrasonic guided wave anomaly imaging method for composite laminates, Feb. 1, 2019, Composite Structures, vol. 209, pp. 233-241 (Year: 2019).*

(Continued)

*Primary Examiner* — Mi'schita' Henson (57) ABSTRACT

The disclosure discloses a Lamb wave phased array focus-imaging method based on a frequency response function. In the method, a piezoelectric sensor array is arranged on a surface of a tested structure, the frequency response function of an excitation and acquisition pair formed by an excitation array element and an acquisition array element is calculated according to a full-band response signal, and a dispersion pre-compensation signal is constructed; the dispersion pre-compensation signal and the frequency response function are multiplied in a frequency domain to obtain a frequency domain pre-compensation response signal; and according to a distance from the acquisition array element to a focal point at the coordinates, the dispersion of the frequency domain pre-compensation response signal is post-compensated, so as to obtain a frequency domain dispersion post-compensation signal until all sensor excitation and acquisition pairs are traversed.

10 Claims, 9 Drawing Sheets
(3 of 9 Drawing Sheet(s) Filed in Color)

(51) Int. Cl.
  *G01N 29/24* (2006.01)
  *G01N 29/46* (2006.01)
  *G06T 7/00* (2017.01)

(52) U.S. Cl.
  CPC ........... *G01N 29/46* (2013.01); *G06T 7/0004* (2013.01); *G01N 2291/023* (2013.01); *G01N 2291/0289* (2013.01); *G01N 2291/0427* (2013.01); *G01N 2291/106* (2013.01); *G06T 2207/10132* (2013.01)

(58) Field of Classification Search
  CPC ... G01N 2291/0289; G01N 2291/0427; G01N 2291/106; G06T 7/0004; G06T 2207/10132
  See application file for complete search history.

(56) References Cited

OTHER PUBLICATIONS

Li et al., Online Structural Health Monitoring of Rotating Machinery via Ultrasonic Guided Waves, Jun. 13, 2018, Shock and Vibration, vol. 2018, Article ID 8142371, pp. 1-12 (Year: 2018).*

Xu, Cai-bun et al., A guided wave dispersion compensation method based on compressed sensing, 2018, Mechanical Systems and Signal Processing, vol. 103, pp. 89-104 (Year: 2018).*

\* cited by examiner

LAMB WAVE PHASED ARRAY FOCUS-IMAGING METHOD BASED ON FREQUENCY RESPONSE FUNCTION

CROSS-REFERENCE TO RELATED APPLICATION

This application claims priority from the Chinese patent application 202011555881.5 filed Dec. 24, 2020, the content of which is incorporated herein in the entirety by reference.

TECHNICAL FIELD

The disclosure belongs to the technical field of structural monitoring, in particular to a Lamb wave phased array focus-imaging method based on a frequency response function.

BACKGROUND

Lamb waves are ultrasonic guided waves with high sensitivity and low attenuation propagating in thin plate structures, and thus being widely used in the field of structural health monitoring. Lamb waves play an important role in aircraft blades and various plate-like and shell-like structures, and can timely warn about potential internal damage of structures so as to ensure property and life safety.

However, Lamb waves have the disadvantages of multi-modality and frequency dispersion, which cause the dispersion of echo energy, and thus reducing the positioning accuracy and identifiability of defects. A Lamb wave phased array focusing method is a damage monitoring method that gathers energy to one point, so as to enhance the reflected energy when there is damage by improving the arrival energy of monitoring points. There are usually two focusing methods. One is to directly excite narrow-band signals for focusing, which is a dispersive focusing method. The other is to conduct pre-compensation design on excitation signals so that Lamb wave signals can still be focused to one point in a narrow-band way when propagating dispersively, which further enhances the reflected energy of the monitoring points. However, the shortcomings of the two methods severely affect their application. The first method is easy to implement, but it has low positioning accuracy and sensitivity to defects. The second method has high sensitivity and positioning accuracy for defect identification, but because signal design and excitation are needed to monitor each point, it takes a lot of time to detect even a small area.

In order to solve the shortcomings of the above Lamb wave phased array focusing detection technology, the disclosure can not only solve the dispersion problem of Lamb wave detection, but also solve the time-consuming problem of Lamb wave phased array focusing detection.

The above information disclosed in the background art is only used to enhance the understanding of the background of the disclosure, so it may contain information that does not constitute the prior art known to those of ordinary skill in the art in China.

SUMMARY

Aiming at the problems existing in the prior art, the disclosure provides a Lamb wave phased array focus-imaging method based on a frequency response function, which not only solves the dispersion problem of Lamb waves, but also greatly improves the damage detection speed by Lamb wave phased array focusing, so that the Lamb wave phased array focusing damage detection method can be better applied to practical industrial scenarios.

The objective of the disclosure is realized by the following technical solution: a Lamb wave phased array focus-imaging method based on a frequency response function includes the following steps:

S100, arranging a piezoelectric sensor array on a surface of a tested structure, sequentially exciting a full-band signal $f_m(t)$ by array elements $P_m$ (m=1, . . . N) of the piezoelectric sensor array, and collecting a response signal $u_{mn}(t)$ of the tested structure by other array elements $P_n$ (n=1, . . . N, n≠m), wherein the coordinates of the excitation array element $P_m$ are set as ($x_m$, $y_m$), the coordinates of the acquisition array element $P_n$ are set as ($x_n$, $y_n$), and subscripts m and n are the number identifiers of the excitation array element and the acquisition array element respectively;

S200, according to the response signal $u_{mn}(t)$, calculating the frequency response function $H_{mn}(\omega)$ of an excitation and acquisition pair composed of the excitation array element $P_m$ at coordinates ($x_m$, $y_m$) and the acquisition array element $P_n$ at coordinates ($x_n$, $y_n$), wherein w is angular frequency and t is time, the excitation array element $P_m$ and the acquisition array element $P_n$ form an excitation and acquisition pair $P_m$-$P_n$, when one sensor in the sensor array acts as the excitation array element, there are (N−1) excitation and acquisition pairs in total, and when all sensors take turns to act as the excitation array element, there are N (N−1) excitation and acquisition pairs in total;

S300, according to a distance $L_m$ from the excitation array element $P_m$ at coordinates ($x_m$, $y_m$) to a focal point $F_{xy}$ at coordinates (x,y) and a narrow-band signal $S(\omega)$ set to focus at $t_F$, constructing a dispersion pre-compensation signal Pcom_$S_m(\omega)$;

S400, multiplying the dispersion pre-compensation signal Pcom_$S_m(\omega)$ by the frequency response function $H_{mn}(\omega)$ in the frequency domain to obtain a frequency domain pre-compensation response signal $G_{mn}(\omega)$;

S500, post-compensating for the dispersion of the frequency domain pre-compensation response signal $G_{mn}(\omega)$ according to a distance $L_n$ from the acquisition array element $P_n$ at coordinates ($x_n$, $y_n$) to a focal point $F_{xy}$ at coordinates (x,y), so as to obtain a frequency domain dispersion post-compensation signal Comp_$G_{mn}(\omega)$, and repeating S300 to S500 until all the sensor excitation and acquisition pairs $P_m$-$P_n$ are traversed;

S600, superposing time domain dispersion post-compensation signals comp_$g_{mn}(t)$ of all the sensor excitation and acquisition pairs $P_m$-$P_n$, taking the Hilbert envelope amplitude $I_{x,y}$ of a superposed signal at the focusing moment $t_F$ as an indicator of damage degree of the focal $F_{xy}$ at coordinates (x,y), and repeating S300 to S600 until all the focal points are detected; and S700, assigning all pixels with values for damage imaging, and taking the value of each pixel as a damage degree indication value $I_{x,y}$ corresponding to a focal position.

In S100 of the method, the excitation signal $f_m(t)$ is a full-band signal, that is, the amplitude of each frequency point in the frequency domain expression $F_m(\omega)$ of $f_m(t)$ is not 0. In order to obtain the frequency response function $H_{mn}(\omega)$, the excitation signal $f_m(t)$ can be a step signal and a chirp signal, but is not limited to the two signals.

In S200 of the method, the frequency response function $H_{mn}(\omega)$ is obtained according to the following formula:

$$H_{mn}(\omega) = \frac{U_{mn}(\omega)}{F_m(\omega)}$$

wherein ω is an angular frequency, t is time, and $U_{mn}(\omega)$ and $F_m(\omega)$ are the frequency domain expression of the response signal $u_{mn}(t)$ and the excitation signal $f_m(t)$ respectively.

In S300 of the method, the surface of the tested structure is divided into imaging rectangular cells, each cell represents a pixel, and a center of each cell serves as a focal point of phased array focusing, with coordinates (x,y).

In S300 of the method, based on the focused narrow-band signal S(ω), the dispersion pre-compensation signal Pcom_$S_m(\omega)$ is:

$$Pcom\_S_m(\omega)=S(\omega)\cdot e^{ik(\omega)L_m},$$

wherein e is a natural logarithm, i is an imaginary unit, the wave number k(ω) is a function of angular frequency ω, the wave number k(ω) changes with an angular frequency ω, and the unit is 1/m.

In the method, the wave number k(ω) is obtained by numerical solution or experiment.

In the method, the focused narrow-band signal S(ω) is:

$$S(\omega)=\int_{-\infty}^{+\infty}(H(t-1/f_m)-H(t-1/f_m-t_F))(1-\cos(2\pi f_m t))$$
$$\sin(2\pi f_c t)e^{-i\omega t}dt$$

wherein t is time, dt is the first-order differential of time, H(t) is a unit step function, e is a natural logarithm, i is an imaginary unit, $f_m$ and $f_c$ are a modulation frequency and a center frequency respectively, and $t_F$ is a set focusing moment and is set according to the size of a detection area.

In S500 of the method, the dispersion post-compensation signals Comp_$G_{mn}(\omega)$ are calculated by the following formula:

$$Comp\_G_{mn}(\omega)=G_{mn}(\omega)\cdot e^{ik(\omega)L_n}$$

wherein e is a natural logarithm, i is an imaginary unit, the wave number k(ω) is a function of angular frequency ω, the wave number k(ω) changes with an angular frequency co, and the unit is 1/m.

In S600 of the method, the time domain dispersion post-compensation signals comp_$g_{mn}(t)$ are calculated by the following formula:

$$comp\_g_{mn}(t)=\int Comp\_G_{mn}(\omega)e^{i\omega t}d\omega$$

wherein e is a natural logarithm, i is an imaginary unit, ω is an angular frequency, and dω represents the first-order differential of the angular frequency.

In S600 of the method, the damage degree indication value $I_{x,y}$ of a focal point $F_{x,y}$ at coordinates (x,y) is calculated by the following formula:

$$I_{x,y} = \text{Hilbert}\left(\sum_{m=1}^{N}\sum_{n=1,n\neq m}^{N} comp\_g_{mn}(t)\right)\bigg|_{t=t_F}$$

wherein Hilbert(•) is Hilbert transform, m represents an excitation signal of an m<th> array element, n represents an acquisition signal of an n<th> array element, and $t_F$ is a focusing moment.

Compared with the prior art, the method disclosed by the disclosure has the beneficial effects that based on the frequency response function and dispersion compensation, damage detection can be quickly carried out on the tested structure through Lamb wave phased array focusing, so that positioning accuracy during damage detection is high, and the method has a great speed advantage over general Lamb focusing detection means. Meanwhile, only step response data need to be stored, which greatly reduces the hardware requirement of data storage.

The above description is only an overview of the technical solution of the disclosure. In order to make the technical means of the disclosure more clear, to the extent that those skilled in the art can implement it according to the contents of the specification, and to make the above and other objectives, features and advantages of the disclosure more obvious and easier to understand, the specific embodiments of the disclosure will be exemplified below.

BRIEF DESCRIPTION OF THE DRAWINGS

Various other advantages and benefits of the disclosure will become apparent to those of ordinary skill in the art upon reading the following detailed description of the preferred embodiments. The drawings of the specification are only for the purpose of illustrating preferred embodiments, and are not to be considered as limiting the disclosure. Obviously, the drawings in the following description are only some embodiments. For those skilled in the art, other drawings can be obtained according to these drawings without creative labor. Furthermore, throughout the drawings, the same parts are denoted by the same reference numerals.

In the drawings.

The patent file contains at least one drawing executed in color. Copies of this patent with color drawing(s) will be provided by the Patent and Trademark Office upon request and payment of the necessary fee.

The disclosure will be further explained with reference to the drawings and embodiments.

DETAILED DESCRIPTION

Specific embodiments of the disclosure will be described in more detail with reference to FIGS. 1 to 12. Although specific embodiments of the disclosure are shown in the drawings, it should be understood that the disclosure may be embodied in various forms and should not be limited by the embodiments set forth herein. On the contrary, these embodiments are provided in order to understand the disclosure more thoroughly and to fully convey the scope of the disclosure to those skilled in the art.

It should be noted that certain words are used in the specification and claims to refer to specific components. It should be understood by those skilled in the art that the same component may be referred to by different nouns. In this specification and claims, components are distinguished not according to nouns, but according to functions. The term "include" or "comprise" mentioned in the whole specification and claims is an open term, and should be interpreted as "including but not limited to". The rest of the specification describes preferred embodiments for implementing the disclosure, but the description is for the purpose of the general principles of the specification, and is not intended to limit the scope of the disclosure. The scope of protection of the disclosure shall be as defined by the appended claims.

In order to facilitate the understanding of the embodiments of the disclosure, specific embodiments will be further explained with reference to the accompanying drawings, and the drawings do not constitute a limitation of the embodiments of the disclosure.

Figure 1:
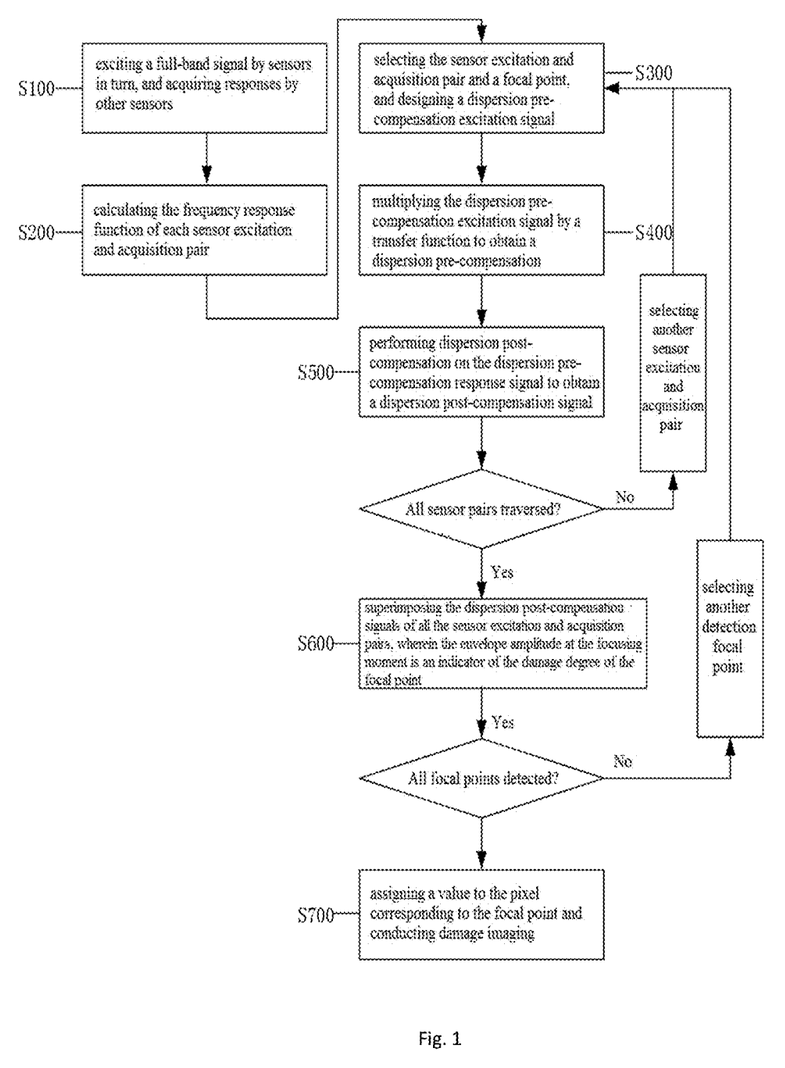
FIG. 1 is a diagram of the steps of a Lamb wave phased array focus-imaging method based on a frequency response function according to an embodiment of the disclosure.

FIG. 1 is a diagram of the steps of a Lamb wave phased array focus-imaging method based on a frequency response function. As shown in FIG. 1, a Lamb wave phased array focus-imaging method based on a frequency response function includes the following steps:

S100, a piezoelectric sensor array is arranged on a surface of a tested structure, a full-band signal $f_m(t)$ is sequentially excited by array elements $P_m$ (m=1, ... N) of the piezoelectric sensor array, and a response signal $u_{mn}(t)$ of the tested structure is collected by other array elements $P_n$ (n=1, ... N, n≠m), wherein the coordinates of the excitation array element $P_m$ are set as $(x_m, y_m)$, the coordinates of the acquisition array element $P_n$ are set as $(x_n, y_n)$, and subscripts m and n are the number identifiers of the excitation array element and the acquisition array element respectively;

S200, according to the response signal $u_{mn}(t)$, the frequency response function $H_{mn}(\omega)$ of an excitation and acquisition pair composed of the excitation array element $P_m$ at coordinates $(x_m, y_m)$ and the acquisition array element $P_n$ at coordinates $(x_n, y_n)$ is calculated, wherein $\omega$ is angular frequency and t is time, the excitation array element $P_m$ and the acquisition array element $P_n$ form an excitation and acquisition pair $P_m$-$P_n$, when one sensor in the sensor array acts as the excitation array element, there are (N−1) excitation and acquisition pairs in total, and when all sensors take turns to act as the excitation array element, there are N(N−1) excitation and acquisition pairs in total;

S300, according to a distance $L_m$ from the excitation array element $P_m$ at coordinates $(x_m, y_m)$ to a focal point $F_{xy}$ at coordinates (x,y) and a narrow-band signal $S(\omega)$ set to focus at $t_F$, a dispersion pre-compensation signal $Pcom\_S_m(\omega)$ is constructed;

S400, the dispersion pre-compensation signal $Pcom\_S_m(\omega)$ is multiplied by the frequency response function $H_{mn}(\omega)$ in the frequency domain to obtain a frequency domain pre-compensation response signal $G_{mn}(\omega)$;

S500, the dispersion of the frequency domain pre-compensation response signal $G_{mn}(\omega)$ is post-compensated according to a distance $L_n$ from the acquisition array element $P_n$ at coordinates $(x_n, y_n)$ to a focal point $F_{xy}$ at coordinates (x,y), so as to obtain a frequency domain dispersion post-compensation signal $Comp\_G_{mn}(\omega)$, and S300 to S500 are repeated until all the sensor excitation and acquisition pairs $P_m$-$P_n$ are traversed;

S600, time domain dispersion post-compensation signals $comp\_g_{mn}(t)$ of all the sensor excitation and acquisition pairs $P_m$-$P_n$ are superposed, the Hilbert envelope amplitude $I_{xy}$ of a superposed signal at the focusing moment $t_F$ is taken as an indicator of damage degree of the focal $F_{xy}$ at coordinates (x,y), and S300 to S600 are repeated until all the focal points are detected; and S700, all pixels are assigned with values for damage imaging, and the value of each pixel is taken as a damage degree indication value $I_{xy}$ corresponding to a focal position.

In a preferred embodiment of the method, in S100, the excitation signal $f_m(t)$ is a full-band signal, that is, the amplitude of each frequency point in the frequency domain expression $F_m(\omega)$ of $f_m(t)$ is not 0. In order to obtain the frequency response function $H_{mn}(\omega)$, the excitation signal $f_m(t)$ can be a step signal and a chirp signal, but is not limited to the two signals.

In a preferred embodiment of the method, in S200, the frequency response function $H_{mn}(\omega)$ is obtained according to the following formula:

$$H_{mn}(\omega) = \frac{U_{mn}(\omega)}{F_m(\omega)}$$

wherein $\omega$ is an angular frequency, t is time, and $U_{mn}(\omega)$ and $F_m(\omega)$ are the frequency domain expression of the response signal $u_{mn}(t)$ and the excitation signal $f_m(t)$ respectively.

In a preferred embodiment of the method, in S300, the surface of the tested structure is divided into imaging rectangular cells, each cell represents a pixel, and a center of each cell serves as a focal point $F_{xy}$ of phased array focusing, with coordinates (x,y).

In a preferred embodiment of the method, in S300, based on the focused narrow-band signal $S(\omega)$, the dispersion pre-compensation signal $Pcom\_S_m(\omega)$ is:

$$Pcom\_S_m(\omega)=S(\omega)\cdot e^{ik(\omega)L_m},$$

wherein e is a natural logarithm, i is an imaginary unit, the wave number $k(\omega)$ is a function of angular frequency $\omega$, the wave number $k(\omega)$ changes with the angular frequency $\omega$, and the unit is 1/m.

In a preferred embodiment of the method, the wave number $k(\omega)$ is obtained by numerical solution or experiment.

In a preferred embodiment of the method, the focused narrow-band signal $S(\omega)$ is:

$$S(\omega)=\int_{-\infty}^{+\infty}(H(t-1/f_m)-H(t-1/f_m-t_F))(1-\cos(2\pi f_m t))\sin(2\pi f_c t)e^{-i\omega t}dt$$

wherein t is time, dt is the first-order differential of time, H(t) is a unit step function, e is a natural logarithm, i is an imaginary unit, and $f_m$ and $f_c$ are a modulation frequency and a center frequency respectively, which are determined according to the characteristics of the damage to be detected. In the case of single damage, the wavelength corresponding to the selected center frequency should be in the same order of magnitude as the size of the detected damage, and the modulation frequency is obtained by reducing the center frequency by 1-5 times. When there are adjacent multiple damages, the width of a wave packet corresponding to the modulation frequency should be smaller than a distance between adjacent damages, and the center frequency should be determined according to the damage size. $t_F$ is a set focusing moment and is set according to the size of a detection area.

In a preferred embodiment of the method, in S500, the dispersion post-compensation signals $Comp\_G_{mn}(\omega)$ are calculated by the following formula:

$$Comp\_G_{mn}(\omega)=G_{mn}(\omega)\cdot e^{ik(\omega)L_n}$$

wherein e is a natural logarithm, i is an imaginary unit, the wave number $k(\omega)$ is a function of angular frequency $\omega$, the wave number $k(\omega)$ changes with an angular frequency co, and the unit is 1/m.

In a preferred embodiment of the method, in S600, the time domain dispersion post-compensation signals $comp\_g_{mn}(t)$ are calculated by the following formula:

$$comp\_g_{mn}(t)=\int_{-\infty}^{+\infty}Comp\_G_{mn}(\omega)e^{i\omega t}d\omega$$

wherein e is a natural logarithm, i is an imaginary unit, $\omega$ is an angular frequency, and $d\omega$ represents the first-order differential of the angular frequency.

In a preferred embodiment of the method, in S600, the damage degree indication value $I_{x,y}$ of a focal point $F_{xy}$ at coordinates (x,y) is calculated by the following formula:

$$I_{x,y}=\text{Hilbert}\left(\sum_{m=1}^{N}\sum_{n=1,n\neq m}^{N}comp\_g_{mn}(t)\right)\bigg|_{t=t_F}$$

wherein Hilbert(•) is Hilbert transform, m represents an excitation signal of an m<th> array element, n represents an acquisition signal of an n<th> array element, and $t_F$ is a focusing moment.

In an embodiment, S300 further includes the following steps:

S301, a narrow-band signal $S(\omega)$ focused at a set moment $t_F$ is designed:

$$S(\omega)=\int(H(t-1/f_m)-H(t-1/f_m-t_F))(1-\cos(2\pi f_m t))\sin(2\pi f_c t)e^{-i\omega t}dt$$

wherein t is time, dt is the first-order differential of time, H(t) is a unit step function, e is a natural logarithm, i is an imaginary unit, $f_m$ and $f_c$ are a modulation frequency and a center frequency respectively which are flexibly determined according to the characteristics of the damage to be detected, and $t_F$ is a set focusing moment and is set according to the size of a detection area.

S302, a wave number $k(\omega)$ of the tested structure is obtained through numerical calculation or experiment; and S303, after obtaining the narrow-band signal $S(\omega)$ and the wave number $k(\omega)$, a dispersion pre-compensation response $Pcom\_S_m(\omega)$ is calculated by the following formula:

$$Pcom\_S_m(\omega)=S(\omega)\cdot e^{ik(\omega)L_m}$$

wherein e is a natural logarithm, i is an imaginary unit, the wave number $k(\omega)$ is a function of angular frequency $\omega$, the wave number $k(\omega)$ changes with an angular frequency co, and the unit is 1/m.

A dispersion post-compensation response $Comp\_G_{mn}(\omega)$ in S500 is obtained by multiplying the dispersion pre-compensation response by a corresponding dispersion wave number term in the frequency domain to eliminate the dispersion of Lamb waves at a specific propagation distance:

$$Comp\_G_{mn}(\omega)=G_{mn}(\omega)\cdot e^{ik(\omega)L_n}$$

wherein e is a natural logarithm, $k(\omega)$ is a wave number of the tested structure related to an angular frequency $\omega$, and the unit is 1/m.

In another embodiment, the time domain dispersion post-compensation signal $comp\_g_{mn}(t)$ in S600 is obtained by inverse Fourier transform, so as to use time domain energy to characterize the energy in a distance domain:

$$comp\_g_{mn}(t)=\int_{-\infty}^{+\infty}Comp\_G_{mn}(\omega)e^{i\omega t}d\omega$$

wherein e is a natural logarithm, i is an imaginary unit, $\omega$ is an angular frequency, and $d\omega$ represents the first-order differential of the angular frequency.

In another embodiment, in S600, the damage degree indicator $I_{x,y}$ of a focal point $F_{xy}$ at coordinates (x,y) is calculated by the following formula:

$$I_{x,y}=\text{Hilbert}\left(\sum_{m=1}^{N}\sum_{n=1,n\neq m}^{N}comp\_g_{mn}(t)\right)\bigg|_{t=t_F}$$

wherein Hilbert(•) is Hilbert transform, m represents an excitation signal of an m<th> array element, n represents an acquisition signal of an n<th> array element, and $t_F$ is a focusing moment.

In this embodiment, for the same detection focal point $F_{xy}$, it is necessary to constantly switch the sensor excitation and acquisition pairs, and because a hardware channel cannot excite and acquire signals at the same time, the excitation array element and the acquisition array element cannot be of the same label, that is, n≠m.

Figure 2:
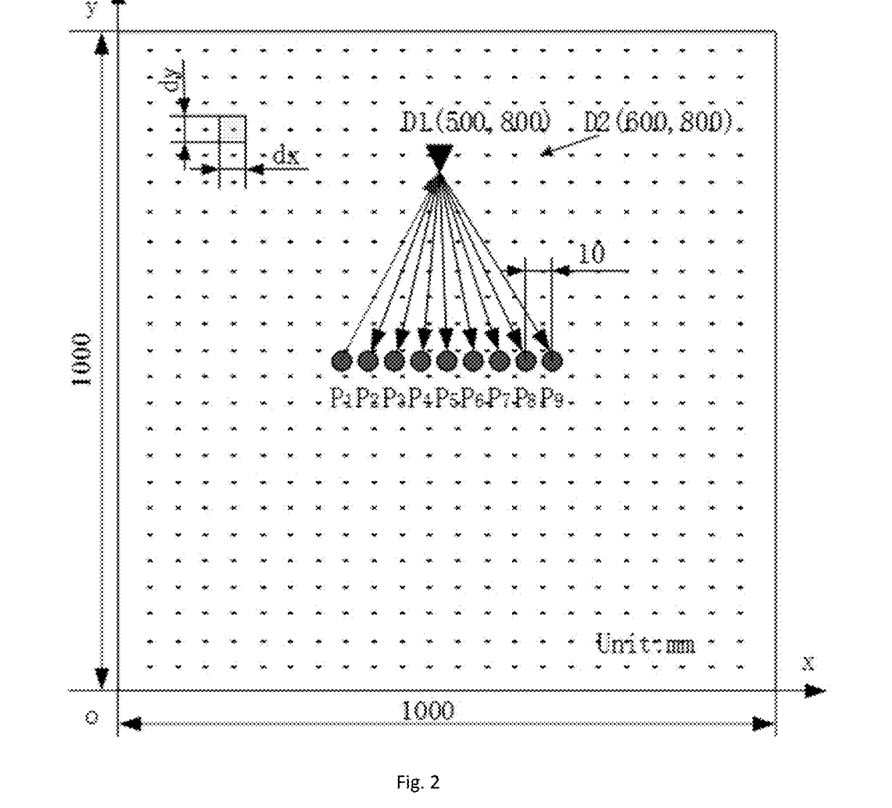
FIG. 2 is a diagram of one-dimensional linear sensor array arrangement, focus division, signal excitation and acquisition in an aluminum plate structure in a Lamb wave phased array focus-imaging method based on a frequency response function according to an embodiment of the disclosure.

See FIG. 2, which is a diagram of one-dimensional linear sensor array arrangement and Lamb wave focusing of an aluminum plate structure in this embodiment. The sensor array is a linear phased array with 9 elements, the pixels are divided into rectangular frames with side lengths dx and dy, and the geometric center of the rectangular frame is the focal point. $P_1 \sim P_9$ sensors excite the full-band signal $f_{mn}(t)$ in turn, while other sensors acquire the response signal $u_{mn}(t)$. When $P_1$ excites the signal $f_{1n}(t)$, n=2 ... 9, the response acquired by $P_2 \sim P_9$ is $u_{12}(t)$, $u_{13}(t)$ ... (t). 9×(9−1) groups of response signals are acquired when excitation is conducted by $P_1 \sim P_9$ in turn. For the two focal points D1 and D2 in FIG. 2, D1 is a focal point with damage, marked with a black triangle, and D2 is a focal point without damage.

Figure 3A:
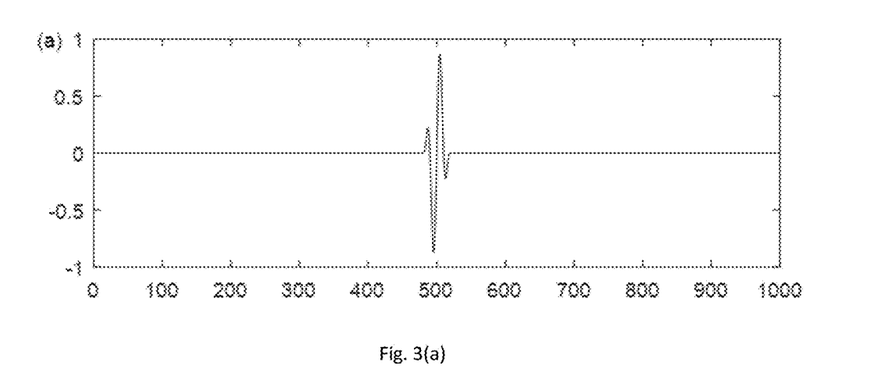
FIGS. 3(a) to 3(b) are waveform diagrams of a pre-compensation excitation signal designed according to a narrow-band focusing signal in a Lamb wave phased array focus-imaging method based on a frequency response function according to an embodiment of the disclosure.
Figure 3B:
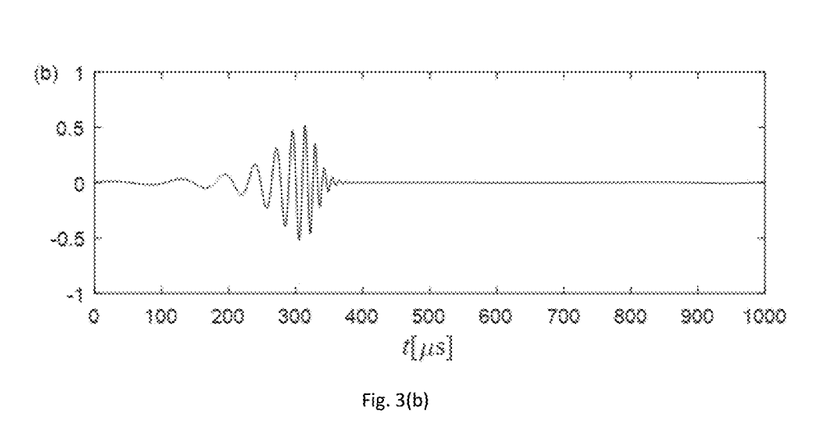

FIGS. 3(a) to 3(b) are waveform diagrams of a pre-compensation excitation signal designed according to a narrow-band focusing signal in this embodiment, which are used to explain the relationship between the narrow-band focusing signal and the pre-compensation excitation signal. FIG. 3(a) shows a narrow-band focusing signal, and FIG. 3(b) shows a dispersion pre-compensation excitation signal. When the dispersion pre-compensation signal propagates to 500 μs, it will have the waveform of FIG. 3(a), that is, the focusing moment set in this embodiment is $t_F$=500 μs.

Figure 4:
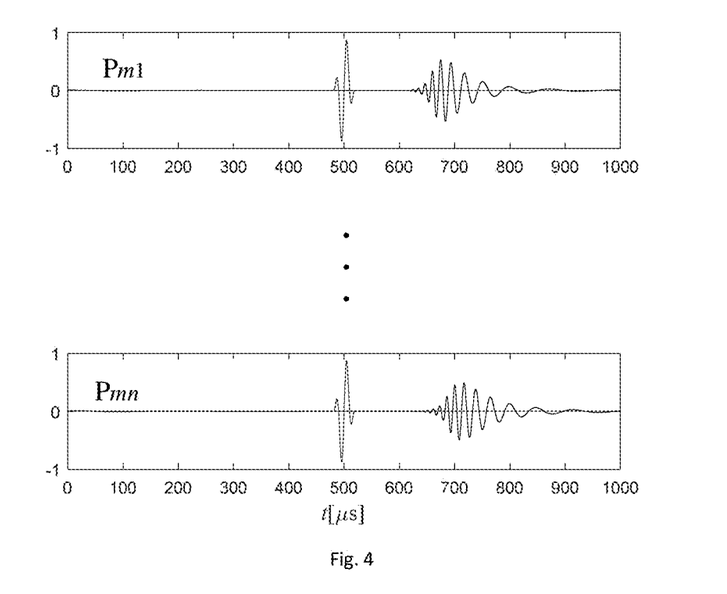
FIG. 4 is a waveform diagram of post-compensating for the dispersion of a dispersion signal in a Lamb wave phased array focus-imaging method based on a frequency response function according to an embodiment of the disclosure.

FIG. 4 is a waveform diagram of post-compensating for the dispersion of a dispersion signal in this embodiment, which is used to explain the relationship between the dispersion signal and the dispersion post compensation signal. In the figure, the wide waveform is the dispersion response signal of the excitation and acquisition pair $P_m$-$P_n$, the excitation and acquisition pair $P_m$-$P_n$ is noted as $P_{mn}$, and the narrow waveform at $t_F$=500 μs is the corresponding dispersion post-compensation signal. It can be seen that compared with the dispersion response signal, the dispersion post-compensation signal has a more compact waveform, so the dispersion is suppressed.

Figure 5:
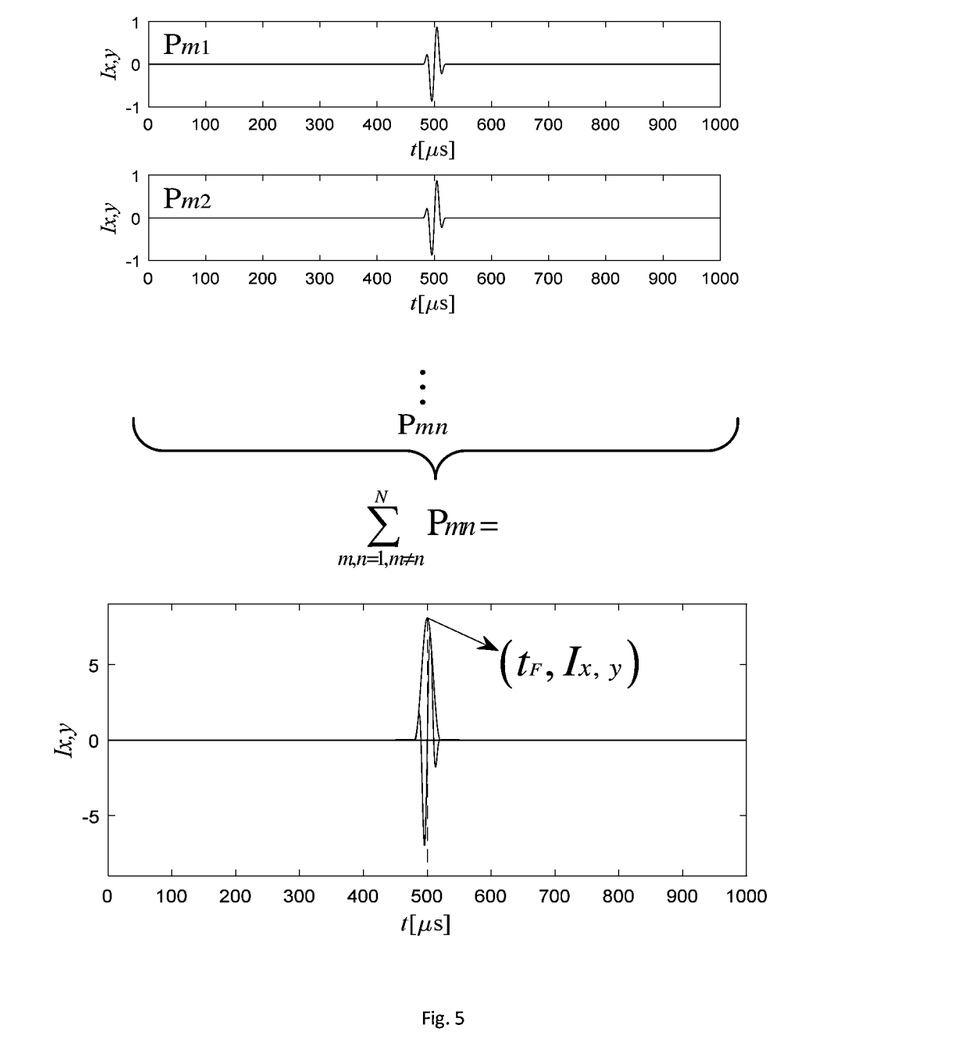
FIG. 5 is a diagram of superimposing dispersion post-compensation signals of all sensor pairs in FIG. 4 in a Lamb wave phased array focus-imaging method based on a frequency response function according to an embodiment of the disclosure.

FIG. 5 is a diagram of superimposing the dispersion post-compensation signals of all the excitation and acquisition pairs in FIG. 4 in this embodiment. By superimposing the dispersion post-compensation signals of all the excitation and acquisition pairs, the amplitude will be more intense, and the Hilbert envelope amplitude at $t_F$ is the damage degree indication value $I_{x,y}$ of the detection focal point. This value $I_{x,y}$ is the pixel value of a pixel at the focal point during damage imaging.

Figure 6:
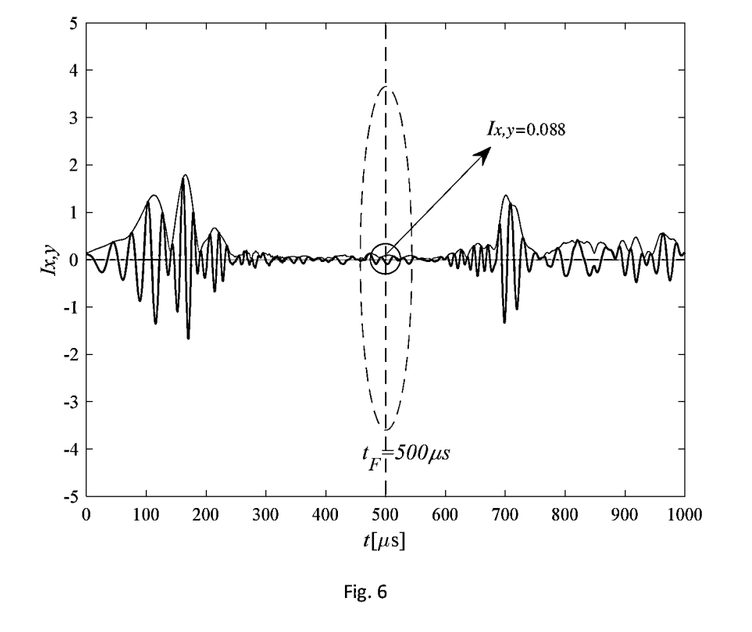
FIG. 6 is a waveform diagram of a superimposed time domain dispersion post-compensation signal of an undamaged focal point (i.e., focal point D2 shown in FIG. 2) in a Lamb wave phased array focus-imaging method based on a frequency response function according to an embodiment of the disclosure.

FIG. 6 is a waveform diagram of a superimposed time domain dispersion post-compensation signal of an undamaged focal point (i.e., focal point D2 shown in FIG. 2) in this embodiment. Since there is no damage at D2, the reflected signal will be weak, so the value of the superimposed dispersion post-compensation signal at the focusing moment $t_F$ is small, and the damage degree indication value of this point $I_{x,y}$=0.088, meaning that the pixel value of the pixel here is 0.088.

Figure 7:
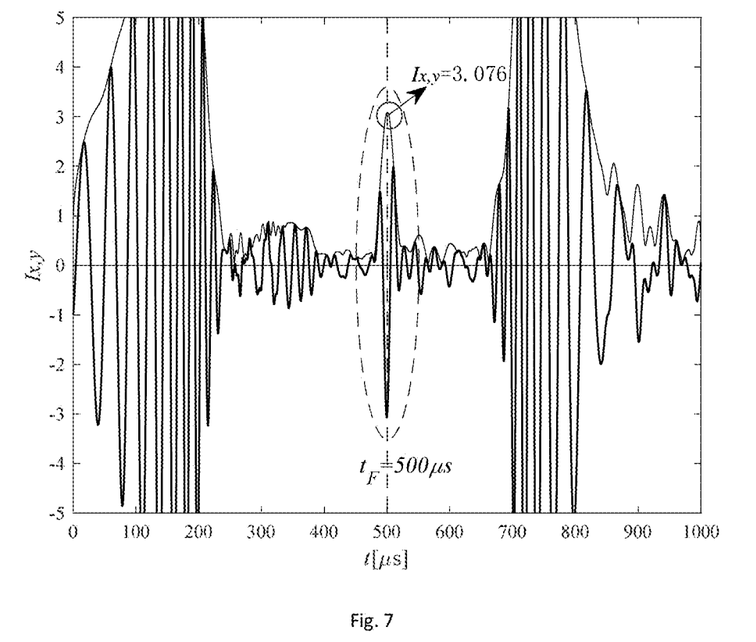
FIG. 7 is a waveform diagram of a superimposed time domain dispersion post-compensation signal of a damaged focal point (i.e., focal point D1 shown in FIG. 2) in a Lamb wave phased array focus-imaging method based on a frequency response function according to an embodiment of the disclosure.

FIG. 7 is a waveform diagram of a superimposed time domain dispersion post-compensation signal of a damaged focal point (i.e., focal point D1 shown in FIG. 2) in this embodiment. Because there is damage at D1, the reflected signal will be intense. The damage degree indication value of D1 is $I_{x,y}$=3.076, meaning that the pixel value of the pixel here is 3.076, which is about 35 times of the pixel value at D2, so the damaged point and undamaged point can be easily distinguished.

Figure 8:
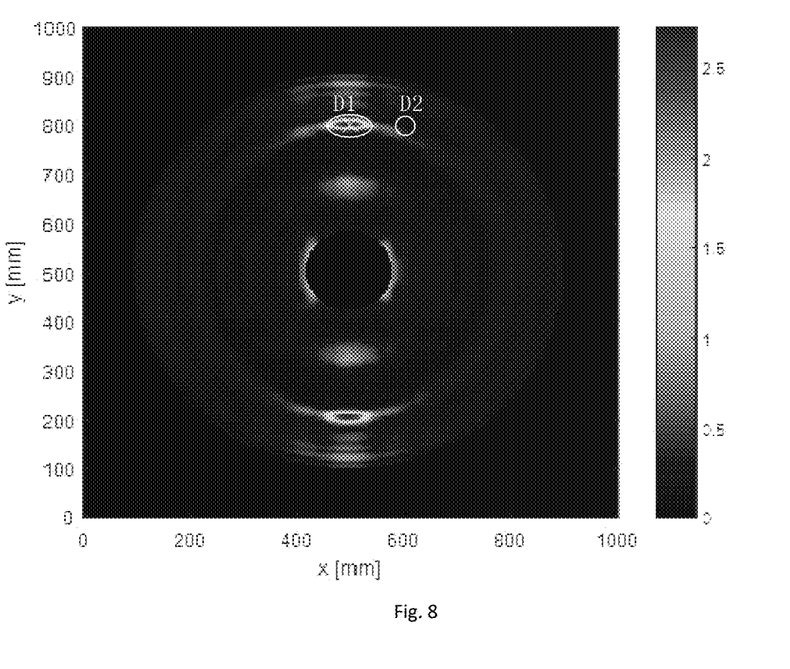
FIG. 8 is a non-reference damage detection imaging diagram in FIG. 2 of a Lamb wave phased array focus-imaging method based on a frequency response function according to an embodiment of the disclosure.

FIG. 8 is a non-reference damage detection imaging diagram of the aluminum plate illustrated in FIG. 2, with pixel side lengths dx=2 mm and dy=2 mm. Non-reference means that there is no need to subtract the step response signal in the damaged state from the step response signal in the undamaged state, and the imaging result obtained in this way is shown in FIG. 8. Because there is no reference signal, original signals will include complex and intense edge reflection signals. Therefore, in order to avoid interference, the detection area will be reduced, and the reduced areas include the part inward from the boundary of the tested structure and the part outward from the center of the sensor. These areas are dead zones of damage detection, which are inevitable for traditional Lamb wave phased array focusing, so the final damage imaging result is a circle.

Figure 9:
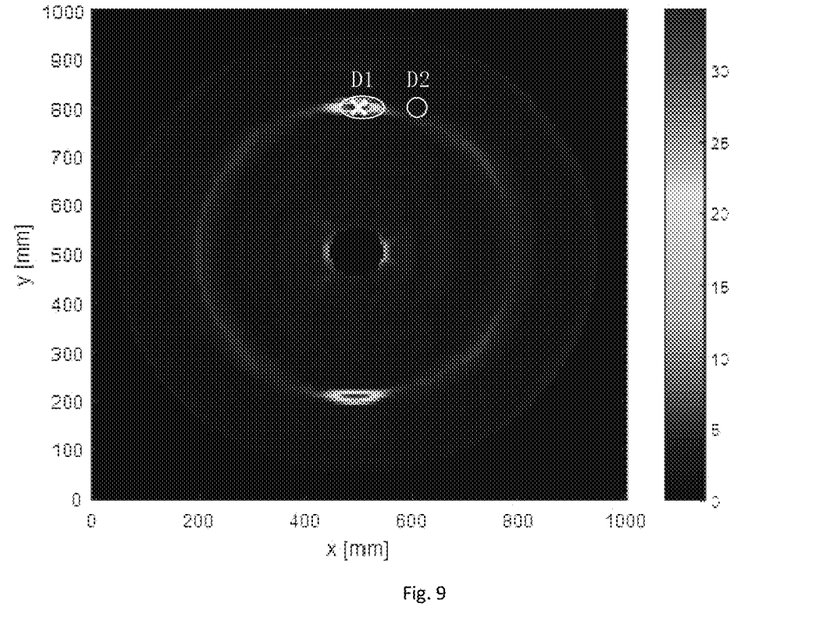
FIG. 9 is a reference damage detection imaging diagram in FIG. 2 of a Lamb wave phased array focus-imaging method based on a frequency response function according to an embodiment of the disclosure.

FIG. 9 is a reference damage detection imaging diagram of the aluminum plate illustrated in FIG. 2, with pixel side lengths dx=2 mm and dy=2 mm Because the method of the disclosure can quickly extract the dispersion post-compensation response signal of each focal point, damage detection with reference signals can be quickly implemented, the size of the dead zone can be reduced by subtracting the reference signals, and the influence of multimodality of Lamb waves can be weakened by subtracting operation. The imaging diagram of reference damage detection in this embodiment is shown in FIG. 9. Compared with FIG. 8, it can be easily seen that the external and internal dead zones of the tested structure are reduced, which not only increases the detection area, but also improves the ability to reflect the damage. It is worth noting that there is a symmetrical pseudo-damage point in FIG. 8 and FIG. 9, which is caused by the symmetrical focus problem of the linear phased array, and can be eliminated by arranging a two-dimensional phased array, see the explanation of FIG. 10 to FIG. 12.

Figure 10:
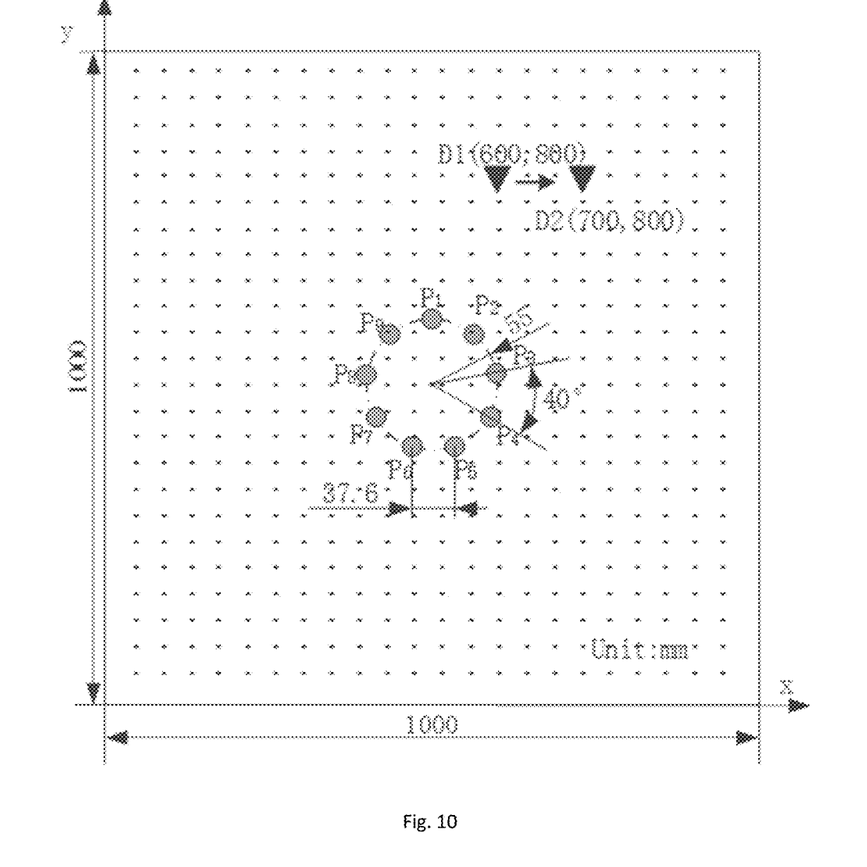
FIG. 10 is a diagram of two-dimensional annular sensor array arrangement and in-plate damage in an aluminum plate structure in a Lamb wave phased array focus-imaging method based on a frequency response function according to an embodiment of the disclosure.

FIG. 10 is a diagram of two-dimensional sensor array arrangement and in-plate damage of an aluminum plate structure in this embodiment, in which there is damage at D1 and D2.

Figure 11:
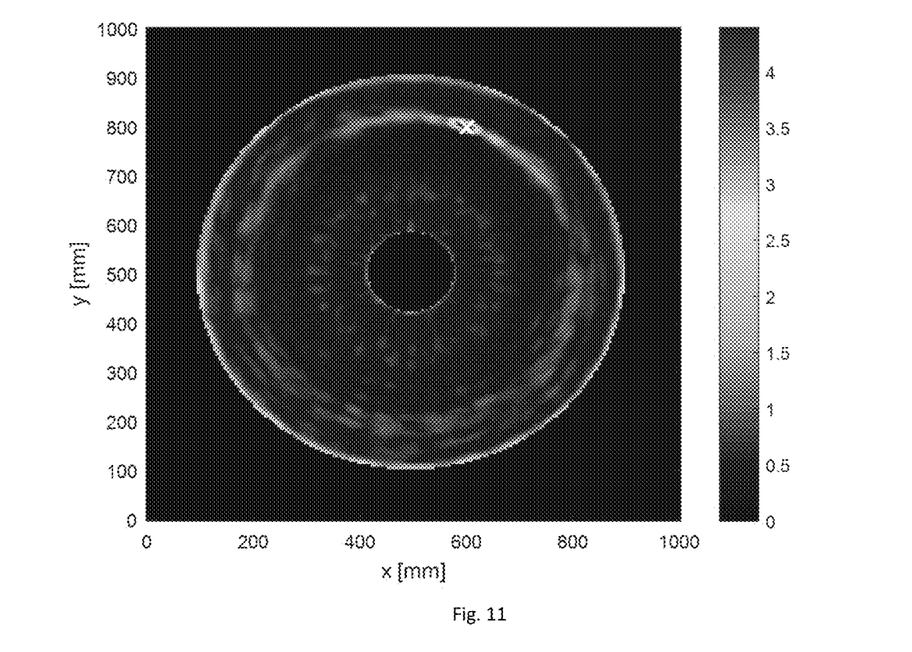
FIG. 11 is a non-reference D1 single damage detection imaging diagram in FIG. 10 of a Lamb wave phased array focus-imaging method based on a frequency response function according to an embodiment of the disclosure.

FIG. 11 is an imaging result of single damage detection when there is damage at D1 in FIG. 10 in this embodiment. The "mirror pseudo-damage" in FIGS. 8 and 9 no longer exists, and the damage can be accurately positioned.

Figure 12:
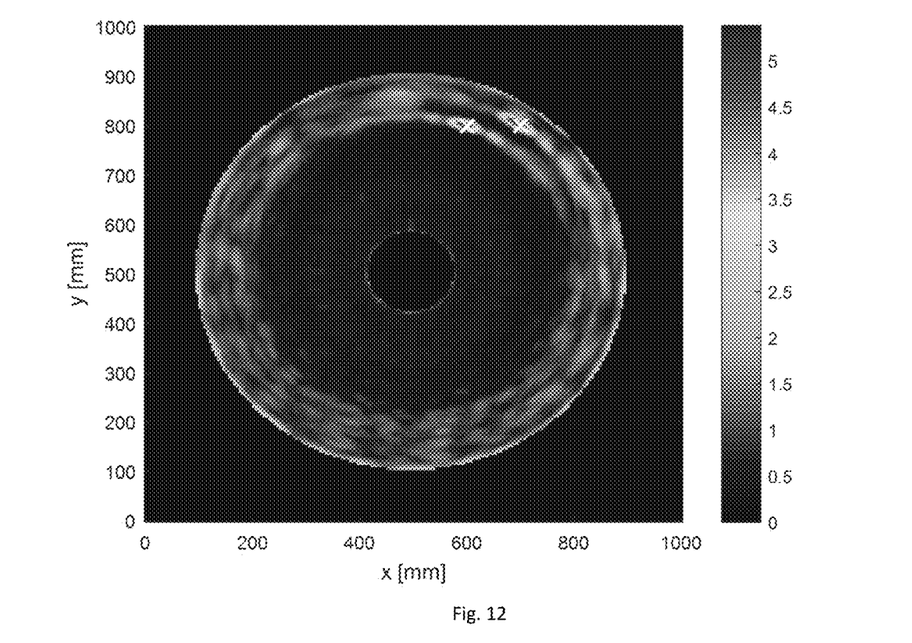
FIG. 12 is a non-reference D1 and D2 multi-damage detection imaging diagram in FIG. 10 of a Lamb wave phased array focus-imaging method based on a frequency response function according to an embodiment of the disclosure.

FIG. 12 is an imaging result of multi-damage detection when there is damage at both D1 and D2 in FIG. 10 in this embodiment. The "mirror pseudo-damage" in FIGS. 8 and 9 no longer exists, and the damage can be accurately and clearly positioned. The disclosure is not limited to the annular phased array form, but also includes other forms of two-dimensional phased arrays, such as rectangular, spiral and concentric circular phased arrays, all of which can be used to carry out damage detection research based on the method of the disclosure.

From the above description with reference to the drawings and embodiments, it can be seen that the disclosure can accurately locate and identify damage, and also overcomes the disadvantage that dead zones are inevitable during phased array imaging.

Although the embodiments of the disclosure have been described above with reference to the drawings, the disclosure is not limited to the above-mentioned specific embodiments and application fields, and the above-mentioned specific embodiments are only illustrative and instructive, not restrictive. Under the inspiration of this specification and without departing from the scope protected by the claims of the disclosure, those of ordinary skill in the art can also obtain various forms, which all fall within the protection scope of the disclosure.

The invention claimed is:

1. A Lamb wave phased array focus-imaging method based on a frequency response function, the method comprising the following steps:

S100, arranging a piezoelectric sensor array on a surface of a tested structure, sequentially exciting a full-band signal $f_m(t)$ by array elements $P_m(m=1, \ldots N)$ of the piezoelectric sensor array, and collecting a response signal $u_{mn}(t)$ of the tested structure by other array elements $P_n(n=1, \ldots N, n \neq m)$, wherein the coordinates of the excitation array element $P_m$ are set as $(x_m, y_m)$, the coordinates of the acquisition array element $P_n$ are set as $(x_n, y_n)$, and subscripts m and n are the number identifiers of the excitation array element and the acquisition array element respectively;

S200, according to the response signal $u_{mn}(t)$ calculating the frequency response function $H_{mn}(\omega)$ of an excitation and acquisition pair composed of the excitation array element $P_m$ at coordinates $(x_m, y_m)$ and the acquisition array element $P_n$ at coordinates $(x_n, y_n)$, wherein $\omega$ is angular frequency and t is time, the excitation array element $P_m$ and the acquisition array element $P_n$ form an excitation and acquisition pair $P_m$–$P_n$, when one sensor in the sensor array acts as the excitation array element, there are (N−1) excitation and acquisition pairs in total, and when all sensors take turns to act as the excitation array element, there are N(N−1) excitation and acquisition pairs in total;

S300, according to a distance $L_m$ from the excitation array element $P_m$ at coordinates $(x_m, y_m)$ to a focal point $F_{xy}$ at coordinates (x,y) and a narrow-band signal $S(\omega)$ set to focus at $t_F$, constructing a dispersion pre-compensation signal Pcom_$S_m(\omega)$;

S400, multiplying the dispersion pre-compensation signal Pcom_$S_m(\omega)$ by the frequency response function $H_{mn}(\omega)$ in the frequency domain to obtain a frequency domain pre-compensation response signal $G_{mn}(\omega)$;

S500, post-compensating for the dispersion of the frequency domain pre-compensation response signal $G_{mn}(\omega)$ according to a distance $L_n$ from the acquisition array element $P_n$ at coordinates $(x_n, y_n)$ to a focal point $F_{xy}$ at coordinates (x,y), so as to obtain a frequency domain dispersion post-compensation signal Comp_$G_{mn}(\omega)$, and repeating S300 to S500 until all the sensor excitation and acquisition pairs $P_m$–$P_n$ are traversed;

S600, superposing time domain dispersion post-compensation signals comp_$g_{mn}(t)$ of all the sensor excitation and acquisition pairs $P_m$–$P_n$, taking the Hilbert envelope amplitude $I_{x,y}$ of a superposed signal at a focusing moment $t_F$ as an indicator of damage degree of the focal $F_{xy}$ at coordinates (x,y), and repeating S300 to S600 until all the focal points are detected; and S700, assigning all pixels with values for damage imaging, and taking the value of each pixel as a damage degree indication value $I_{x,y}$ corresponding to a focal position.

2. The method according to claim 1, wherein in S100, the excitation full-band signal $f_m(t)$ is a step signal and a chirp signal.

3. The method according to claim 1, wherein in S200, the frequency response function $H_{mn}(\omega)$ is obtained according to the following formula:

$$H_{mn}(\omega) = \frac{U_{mn}(\omega)}{F_m(\omega)}$$

wherein $\omega$ is an angular frequency, and $U_{mn}(\omega)$ and $F_m(\omega)$ are the frequency domain expression of the response signal $u_{mn}(t)$ and the excitation signal $f_m(t)$ respectively.

4. The method according to claim 1, wherein in S300, the surface of the tested structure is divided into imaging rectangular cells, each cell represents a pixel, and a center of each cell serves as a focal point of phased array focusing, with coordinates (x,y).

5. The method according to claim 1, wherein in S300, based on the focused narrow-band signal $S(\omega)$, the dispersion pre-compensation signal Pcom_$S_m(\omega)$ is:

$$P\text{com}\_S_m(\omega) = S(\omega) \cdot e^{ik(\omega)L_m}$$

wherein e is a natural logarithm, i is an imaginary unit, the wave number $k(\omega)$ is a function of angular frequency $\omega$, the wave number $k(\omega)$ changes with an angular frequency $\omega$, and the unit is 1/m.

6. The method according to claim 4, wherein the wave number $k(\omega)$ is obtained by numerical solution or experiment.

7. The method according to claim 4, wherein the focused narrow-band signal $S(\omega)$ is:

$$S(\omega) = \int_{-\infty}^{+\infty} (H(t-1/f_m) - H(t-1/f_m - t_F))(1 - \cos(2\pi f_m t)) \sin(2\pi f_c t) e^{-i\omega t} dt$$

wherein t is time, dt is the first-order differential of time, H(t) is a unit step function, e is a natural logarithm, i is an imaginary unit, $f_m$ and $f_c$ are a modulation frequency and a center frequency respectively, and $t_F$ is a set focusing moment and is set according to the size of a detection area.

8. The method according to claim 1, wherein in S500, the dispersion post-compensation signals Comp_$G_{mn}(\omega)$ are calculated by the following formula:

$$\text{Comp}\_G_{mn}(\omega) = G_{mn}(\omega) \cdot e^{ik(\omega)L_n}$$

wherein e is a natural logarithm, i is an imaginary unit, the wave number $k(\omega)$ is a function of angular frequency $\omega$, the wave number $k(\omega)$ changes with an angular frequency $\omega$, and the unit is 1/m.

9. The method according to claim 1, wherein in S600, the time domain dispersion post-compensation signals comp_$g_{mn}(t)$ are calculated by the following formula:

$$\text{comp}\_g_{mn}(t) = \int_{-\infty}^{+\infty} \text{Comp}\_G_{mn}(\omega) e^{i\omega t} d\omega$$

wherein e is a natural logarithm, i is an imaginary unit, $\omega$ is an angular frequency, and $d\omega$ represents the first-order differential of the angular frequency.

10. The method according to claim 1, wherein in S600, the damage degree indication value $I_{x,y}$ of a focal point at coordinates (x,y) is calculated by the following formula:

$$I_{x,y} = \text{Hilbert}\left(\sum_{m=1}^{N} \sum_{n=1, n \neq m}^{N} \text{comp}\_g_{mn}(t)\right)\bigg|_{t=t_F}$$

wherein Hilbert(·) is Hilbert transform, m represents an excitation signal of an m<th> array element, n represents an acquisition signal of an n<th> array element, and $t_F$ is a focusing moment.

* * * * *